United States Patent [19]

Lee

[11] Patent Number: 5,381,603
[45] Date of Patent: Jan. 17, 1995

[54] REFERENCE POINTER FOR A COMPASS DISPLAY

[75] Inventor: John S. Lee, San Francisco, Calif.

[73] Assignee: Precision Navigation, Inc., Mountain View, Calif.

[21] Appl. No.: 99,046

[22] Filed: Jul. 27, 1993

Related U.S. Application Data

[63] Continuation of Ser. No. 790,678, Nov. 8, 1991, abandoned.

[51] Int. Cl.⁶ .................................... G01C 17/10
[52] U.S. Cl. .................... 33/355 R; 33/349; 33/352
[58] Field of Search .......... 353/355 R, 361, 349, 353/351, 352, 354, 272

[56] References Cited

U.S. PATENT DOCUMENTS

| | | | |
|---|---|---|---|
| 4,656,750 | 4/1987 | Pitt et al. | 33/354 |
| 4,668,100 | 5/1987 | Murakami et al. | 33/354 |
| 4,774,766 | 10/1988 | Posseme | 33/361 |
| 4,894,922 | 1/1990 | Lovelock | 33/361 |
| 4,989,333 | 2/1991 | Helldörfer et al. | 33/361 |
| 5,173,709 | 12/1992 | Lauro et al. | 33/349 |
| 5,175,936 | 1/1993 | Sato | 33/361 |

FOREIGN PATENT DOCUMENTS

| | | | |
|---|---|---|---|
| 0067914 | 3/1990 | Japan | 33/361 |
| 0098622 | 4/1990 | Japan | 33/361 |

OTHER PUBLICATIONS

CETREK 555 Programmable Electronic Compass—Sales brochure for a course deviation compass. Made by Cetrek Ltd., 11 Balena Close, Creekmoor, Poole, Dorset BH17 7DB, England.

Sailcomp PC103 digital compass—Sales brochure for a course deviation compass. Made by KVH Industries of 850 Aquidneck Avenue, Middletown, Rhode Island 02840.

Ritchie MagTronic Compass for steering a boat. Sales brochure for course and deviation compass. Made by E. S. Ritchie and Sons, Inc. 243 Oak Street Pembroke, Mass. 02359.

*Primary Examiner*—William A. Cuchlinski, Jr.
*Assistant Examiner*—William C. Dowling
*Attorney, Agent, or Firm*—Donald Boys

[57] ABSTRACT

An electronic compass has a display including a reference pointer that indicates a reference heading stored in response to an input signal. The reference heading is the current heading at the time of the input signal, and the reference pointer in the display is updated as the orientation of the compass changes.

18 Claims, 4 Drawing Sheets

2

REFERENCE POINTER FOR A COMPASS DISPLAY

CROSS REFERENCE TO RELATED APPLICATIONS

This is a continuation of application Ser. No. 07/790,678 filed Nov. 8, 1991, now abandoned.

FIELD OF THE INVENTION

The present invention is in the field of electronic compasses and relates more specifically to displays for such compasses and the operation of the displays.

BACKGROUND OF THE INVENTION

Compasses conventionally have been mechanical devices that utilize a pointer of magnetic material that aligns with the weak magnetic field of the Earth. The pointer for these devices is typically pivoted on a bearing and indicates the direction of the Earth's magnetic poles. Other indicia can be used to indicate the user's current heading in degrees from magnetic North.

The art and science of electronics has been applied to compasses, replacing magnetic pointers with solid-state magnetic sensors that measure the Earth's field and circuitry to process the sensor data and output information on a display. For example, existing compasses utilize microprocessor-based systems to measure the direction of the Earth's field with bi-axial fluxgate magnetometers and output this information on liquid crystal displays (LCDs). These displays typically indicate a bearing in degrees from magnetic North.

Electronic compasses have overcome many limitations of mechanical compasses, such as the slow response of the pointer pivot. There are some drawbacks of mechanical compasses, however, that have not yet been adequately solved by electronic equivalents. One is the inability to record and dynamically display a selected heading on a compass rose as a convenient reference to be used in navigational operations.

Many instances arise during which one would like to conveniently remember and recall a direction (heading). For example, a traveler may be driving a vehicle along a familiar roadway in a particular direction, and get disoriented by an unexpected detour, or by taking a side road or highway exit into an unfamiliar neighborhood. In this instance, the ability to recall the direction of the original roadway greatly facilitates reorientation.

As another example, a hiker in a wilderness often must use a compass to follow a specific bearing to reach a given destination. The hiker would be assisted by an ability to graphically record the desired course on the compass display and maintain course by simply observing deviations from this reference direction.

A third example involves the problem of returning to a particular location from a second known position. Many people often forget where they parked their car in large sports stadium or shopping mall parking lots. If such a person had a hand-held compass that could record and display a heading, the user could point the compass to the direction (heading) of the facility's entrance upon exiting the car, record the direction, then turn off the compass and proceed with their activities. When wishing to return to the car, they can display the original direction on the compass and simply follow the path in the opposite direction.

What is clearly needed is a compass with an ability to accept a user signal and record the current heading in response. The compass should also be able to dynamically display the stored heading as direction changes so the user can make course corrections and steering decisions while travelling.

SUMMARY OF THE INVENTION

A display for an electronic compass is provided according to the invention with a reference pointer indicating a reference heading stored in response to an input signal and updated as the compass changes position. The reference heading is the current heading at the time the input signal is made. The display in a preferred embodiment is a radial element proceeding from about the center of the display, and is bracketed by radial lines to emphasize the reference pointer. Similar radial lines bracket the direction opposite the reference pointer. The display in the preferred embodiment is a liquid crystal display.

In another embodiment of the invention an electronic compass is provided having a display for presenting heading information, sensing elements for sensing the orientation of the compass relative to the Earth's magnetic field, providing position signals relative to the orientation, input devices for a user to provide input signals, and a controller coupled to the display, the sensing elements and the input devices for receiving the position and input signals, causing the display to present a reference pointer according to the reference heading, and adjusting the position of the reference pointer as the compass position changes.

In a preferred embodiment the display is a liquid crystal display, the reference pointer is a radial element, and the reference pointer is bracketed by radial lines that emphasize the position of the reference pointer. Similar radial lines bracket the direction opposite the heading of the reference pointer.

In the preferred mode the compass has a set pushbutton that operates as a toggle input. A first use of the set pushbutton causes the current heading to be stored as the reference heading and a reference pointer to be displayed according to the reference heading. A next set input cancels the stored reference heading and the reference pointer, and a next use stores a new reference heading and displays a reference pointer according to the then-current heading.

Also in the preferred mode, when the electronic compass of the invention is turned off while displaying a reference pointer, the reference heading is retained, and the reference pointer is redisplayed according to the retained reference heading when the compass is turned on again.

A method is provided using a compass of the invention for setting a reference heading and selecting direction of travel according to a reference pointer displayed on the compass according to the stored reference heading.

DESCRIPTION OF THE PREFERRED EMBODIMENTS

Figure 1:
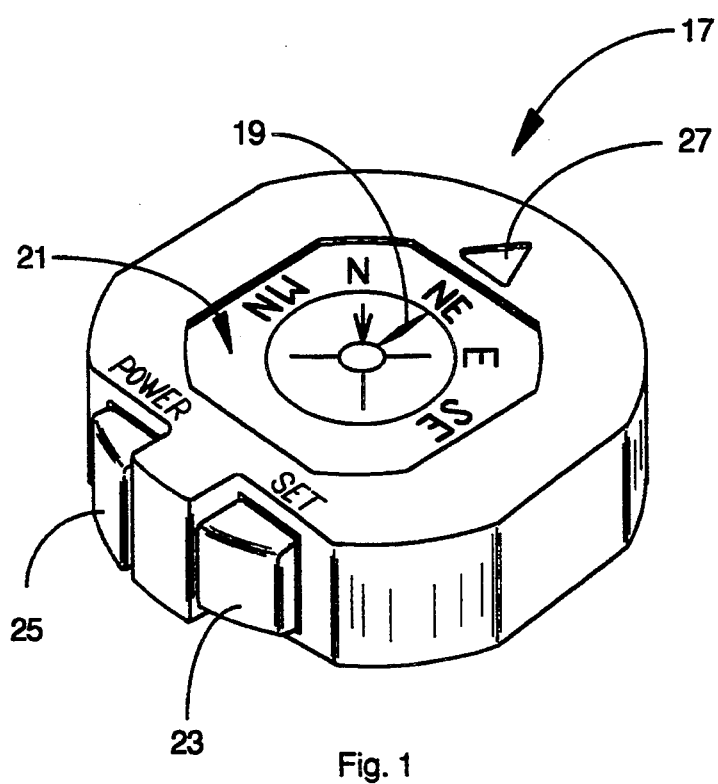
FIG. 1 is an orthographic illustration of one embodiment of a compass according to the invention.

FIG. 1 is an orthographic illustration of a compass 17 according to the invention, capable of accepting a user signal and storing the heading at the time of the signal in response. After storing the heading the compass displays the stored heading by means of a reference pointer 19 on the same display 21 that provides current information.

Compass 17 is a battery powered electronic compass and display 21 is an LCD display. Button 25 is an on/off toggle switch turning the compass and the display on and off. Indicator 27 is a fixed indicator on the compass case, and is intended to be oriented in the direction of travel so it serves as an indicator of current heading. Button 23, marked "set", is for providing a user signal to record the current heading to be displayed by the reference pointer, and is also used for input signals for some other purposes.

The compass of FIG. 1 is capable of compensation for orientation out of the horizontal plane, and when used in a vehicle can be mounted in a bracket affixed to the inside surface of a vehicle windscreen. In this mounting, the compass can be oriented with the display surface vertical, or nearly so, and also rotated around a vertical axis so the display surface is positioned substantially orthogonal to a driver's view, and thus easily seen.

Figure 2A:
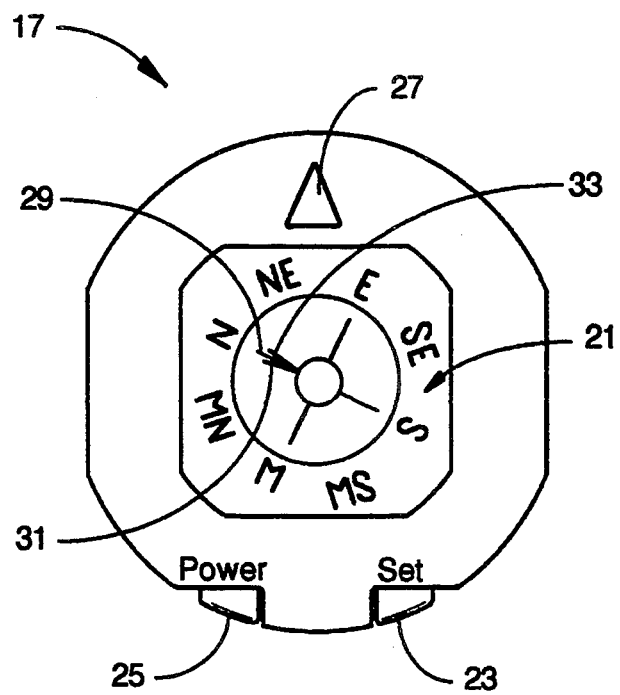
FIG. 2A is a face-on view of the compass of FIG. 1.

FIG. 2A shows the display face of the compass of FIG. 1. Indicator 27 is meant to be oriented in the direction of current heading which, with the compass mounted in a vehicle, is the forward direction of the vehicle in motion. Pointer 29 is the North pointer, and always indicates the Northerly direction. The North pointer in the preferred embodiment is bracketed by two shorter radial lines 31 and 33. According to the current display, the vehicle in which the compass is mounted has a current heading of substantially East Northeast.

Figure 2B:
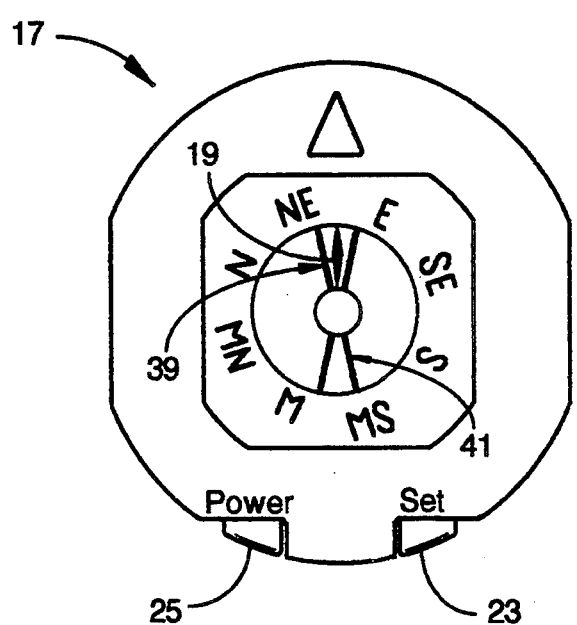
FIG. 2B is another face-on view of the compass of FIG. 1, showing also a reference pointer according to the invention.

To use the reference pointer according to the invention with the compass of FIG. 2A, one presses Set button 23 momentarily. The compass has a controller described below that records the heading at the time the user presses the Set button, and displays reference pointer 19 on that heading as shown in FIG. 2B.

In the preferred mode, the North pointer and related East, West, and South pointers of the "current" display shown in FIG. 2A, are no longer shown on the display once the reference pointer is displayed. Instead, bracketing indicia comprising radial lines 39 and 41 are shown as well as the reference pointer. Bracketing indicia 39 emphasizes the reference heading as indicated by the reference pointer, and bracketing indicia 41 emphasizes the direction opposite the reference heading. Indicia 41 denoting the direction opposite the reference heading has proven to be very useful for such purposes as backtracking.

The reference pointer is not limited to display with the bracketing indicia. It may be displayed with other enhancements in other embodiments, and in an alternative embodiment may be displayed with the "current" display (See FIG. 2A), rather than with the bracketing indicia.

After the reference pointer is displayed in response to the user's signal, it continues to be displayed until button 23 is depressed again, which cancels the reference pointer and switches the operating mode to the "current" display of FIG. 2A. Button 23 acts as a toggle to switch the display between the display with the reference pointer and the current display. Each time button 23 is depressed with the current display of FIG. 2A active, a new reference heading is recorded according to the orientation of the compass at the instant button 23 is depressed.

Figure 3A:
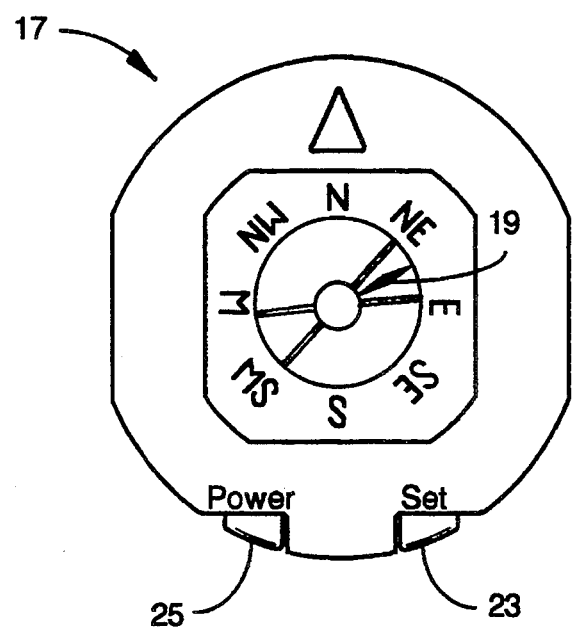
FIG. 3A shows the compass display of the compass of FIG. 1 after a change in heading.
Figure 3B:
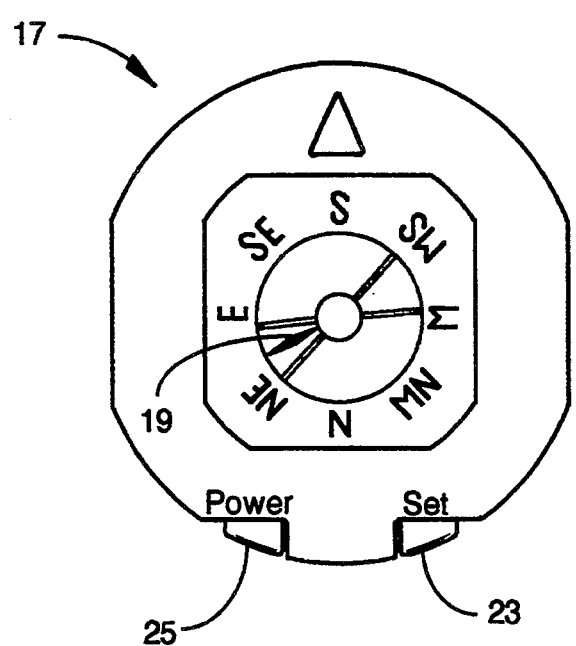
FIG. 3B shows the compass display of the compass of FIG. 3A after yet another change in heading.

As the vehicle in which the compass of the invention is mounted, or the person carrying the compass changes heading, the reference pointer indicates the heading at the time of the user signal, and the user has the advantage of being able to compare the current heading at any time with the reference pointer heading. FIG. 3A shows the display after the reference pointer was set at East Northeast as in FIG. 2B and the current heading has changed to due North. FIG. 3B shows the display at a later time, and the current heading is due South. The reference pointer continues to point the stored heading of East Northeast.

Figure 4:
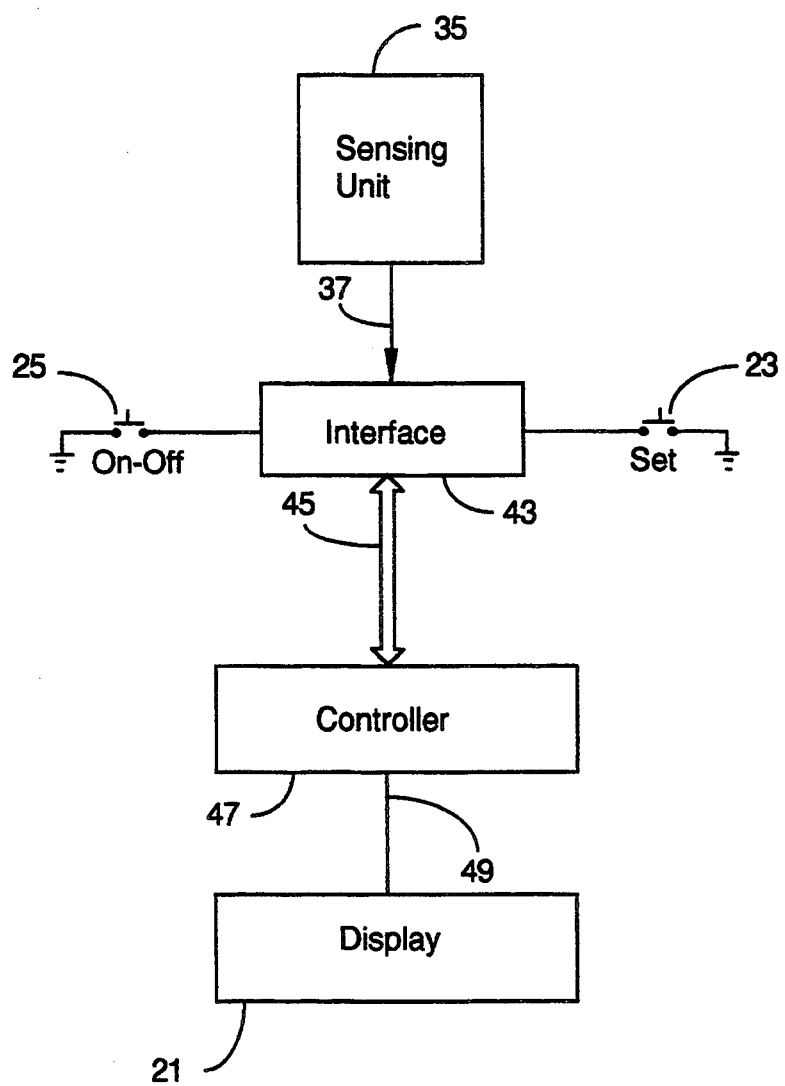
FIG. 4 is a block diagram of the electronic architecture of the compass of FIG. 1.

FIG. 4 is a block diagram of electronics for the compass of the invention capable of displaying a reference pointer. Sensing unit 35 measures the Earth's magnetic field and provides a proportional signal to interface circuitry 43 on line 37.

There are a number of different possibilities known in the art for sensing the Earth's field and providing a signal. One such is by fluxgate technology as described above. Another is by a mechanical magnetic pointer in combination with one or more encoders to provide a signal relative to the pointer position.

There are power and ground connections to the sensor and other elements of the compass electronics shown in FIG. 4, but these are not shown. Line 37 leads to interface circuitry 43 where the signals provided are processed for delivery to a microprocessor-based controller 47 on a digital bus 45. Power switch 25 and set switch 23 also are coupled to interface 43 and provide contact closure-type signals. Controller 47 is a controller available in the art such as used for providing electronic control for many instruments and appliances. It comprises the logic, memory, and display driver routines and output for driving the LCD display according to inputs and control logic.

Controller 47 processes input from interface 43 derived from signals from the field sensing unit, performs other tasks, such as those related to set-up and the reference pointer, typically with initiation by a user, and provides output on path 49 for activating and deactivating LCD sectors in display 21.

With the compass mounted in a vehicle or otherwise held so the display may be seen, whether or not the current heading indicator 27 is actually toward the current heading, one activates the reference feature of the invention by pressing set button 23 momentarily. In response to the set signal, the controller stores the current heading at the time the set signal is made. The set signal also causes the controller to provide appropriate data and commands to circuitry 51 to display reference pointer 19 (FIG. 2B) on display 21.

Subsequent to the set signal, and until the reference pointer is deactivated, the controller continues to display the reference pointer on the heading current when the set signal was given, along with the bracketing indicia as shown in FIG. 2B, and updates the display at regular intervals, as the compass and the vehicle or person holding the compass moves and changes direction. The reference pointer is then available for comparison with current heading information.

If power switch 25 is depressed while the reference pointer is displayed, the compass is turned off. When the compass is turned on again, the reference pointer is displayed on the same heading as when the compass was turned off. The stored heading is retained when power is turned on and off. If button 23 is depressed while the reference pointer is displayed, the reference pointer is canceled and the display of FIG. 2A is activated. When Set button 23 is depressed again, a new reference heading is stored and displayed.

It will be apparent to one with skill in the art that there are many changes to the embodiments described that might be made without departing from the spirit and scope of the invention. For example, there are alternative sensing devices for sensing the Earth's magnetic field. Two different ways are by fluxgate sensors and by encoded mechanical devices as described above. Position sensing may also be done by receiving transmitted signals from outside the compass, such as signals from satellites in orbit. The use of different and competing sensing technologies does not depart from the spirit and scope of the invention. There are, as another example, many ways for implementing the necessary conversions and the control elements to provide the reference pointer of the invention. There are likewise competing technologies for providing a flat panel display, other than LCD technology. None of these alternatives, and similar alternatives, depart from the spirit and scope of the invention.

What is claimed is:

1. A display for an electronic compass comprising:
   display means for displaying heading information, said display means having an array of pointer shapes substantially invisible unless activated; and
   control means for selectively activating said pointer shapes, said control means comprising memory means for storing a reference heading measured in response to a user signal, said reference heading being the current heading at the time of said user signal;
   said control means configured to selectively activate said pointer shapes to provide a reference pointer pointing in the direction of said reference heading as the compass moves and current heading changes.

2. A display as in claim 1 wherein said display means additionally comprises bracket shapes, and said control means activates bracket shapes to either side of each pointer shape displayed, and additionally activates bracket shapes bracketing the direction opposite the direction of each pointer shape displayed.

3. A display as in claim 1 wherein the display comprises a liquid-crystal display.

4. A display as in claim 1 wherein said control means is additionally configured to display alphanumeric direction indicia around the periphery of said display, said alphanumeric indicia positioned such that a line form the approximate center of the display to individual direction indicia will point substantially in the direction indicated by said individual direction indicia.

5. A display as in claim 1 wherein said control means is additionally configured to excite individual ones of said pointer shapes to display a north pointer on said display means.

6. A display as in claim 1 wherein said control means is additionally configured to display alphanumeric direction indicia around the periphery of said display, said alphanumeric indicia positioned such that a line from the approximate center of the display to individual direction indicia will point substantially in the direction indicated by said individual direction indicia, and to excite individual ones of said pointer shapes to display a north pointer on the same display as said reference pointer and said alphanumeric direction indicia.

7. An electronic compass comprising:
   display means for displaying heading information;
   sensing means for determining the orientation of the compass relative to the Earth's magnetic field and for providing a signal related to said orientation;
   input means for a user to supply input signals; and
   control means coupled to said display means, to said sensing means, and to said input means for receiving said signal related to orientation and said input signals, and for causing said display means to display heading information in response to said signals;
   wherein said control means is configured to store a currently sensed heading as a reference heading in response to a user input signal, to cause said display means to display said reference heading as a reference pointer pointing the direction of said reference heading, and to adjust the position of said reference pointer in said display means as the position and direction of said compass changes.

8. A compass as in claim 7 wherein said display means comprises a liquid crystal display.

9. A compass as in claim 7 wherein said reference pointer is a radial element proceeding from the approximate center of said display means.

10. A compass as in claim 9 wherein said reference pointer is bracketed in said display by radial lines on either side of said reference pointer, and the direction opposite the reference pointer is bracketed by radial lines in the same manner as the reference pointer.

11. A compass as in claim 7 wherein said input means comprises a set pushbutton operating as a toggle input such that one operation of said set pushbutton stores the current heading as the reference heading with said compass displaying said reference pointer according to said reference heading, the next operation of said pushbutton cancels said reference heading and the corresponding displayed reference pointer, and the next operation of said pushbutton stores a new reference heading according to the then-current heading, displaying the reference pointer according to the new reference heading.

12. A compass as in claim 7 wherein when said compass is turned off while displaying a reference pointer according to a stored reference heading, said control means retains said stored reference heading, so that when said compass is turned on again, said reference pointer is again displayed according to said stored reference heading.

13. An electronic compass as in claim 7 wherein said control means is additionally configured to display alphanumeric direction indicia around the periphery of said display means and a north pointer pointing in the direction of magnetic north, and said compass is configured to operate in display modes comprising one or more of said reference pointer, said north pointer, and said alphanumeric indicia, said modes selectable by said input signals.

14. An electronic compass as in claim 13 wherein said input signals comprise a signal for selecting between displaying said reference pointer and not displaying said reference pointer.

15. A method for selecting direction of travel comprising steps of:
- measuring and storing a current heading as a reference heading in a control means of an electronic compass;
- displaying a reference pointer on a display of said compass, said reference pointer indicating the direction of the stored reference heading and being updated to continue to point the direction of the stored reference heading as said compass changes position and heading; and
- selecting direction of travel based on said displayed reference pointer.

16. A display for an electronic compass comprising:
- display means for providing heading information, said display means configured to display a direction indicator;
- control means connected to said display means for managing said display means to display said direction indicator; and
- memory means connected to said control means for receiving a heading from a direction sensor and for storing said heading as a reference heading in response to a user input;
- said control means configured to provide said direction indicator on said display means indicating the direction of said reference heading as position and current heading changes.

17. A compass comprising:
- a display with direction indicia, said display configured to orient to magnetic north as said compass moves; and
- a direction indicator settable to indicate a direction at a fixed deviation from north as said compass moves, such that said direction indicator maintains said fixed deviation between settings.

18. An electronic compass comprising:
- display means for displaying direction information;
- control means coupled to said display means for managing said display means; and
- input means for a user to supply input signals;
- said control means configured to display a reference pointer as a direction indicator having a constant offset from north, and wherein said reference pointer may be turned on and turned off in said display by an input signal.

* * * * *